(12) United States Patent
Divivier

(10) Patent No.: US 7,110,405 B2
(45) Date of Patent: Sep. 19, 2006

(54) MULTICAST CELL BUFFER FOR NETWORK SWITCH

(75) Inventor: Robert J. Divivier, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 1013 days.

(21) Appl. No.: 09/955,615

(22) Filed: Sep. 18, 2001

(65) Prior Publication Data

US 2003/0053470 A1 Mar. 20, 2003

(51) Int. Cl.
*H04L 12/56* (2006.01)
(52) U.S. Cl. .................. 370/390; 370/395.7; 370/412; 370/428
(58) Field of Classification Search ............. 370/395.7, 370/395.71, 395.72, 390, 395.1, 396, 398, 370/412, 413, 428
See application file for complete search history.

(56) References Cited

U.S. PATENT DOCUMENTS

| 5,825,767 A | * | 10/1998 | Mizukoshi et al. ...... 370/395.7 |
| 5,875,189 A | * | 2/1999 | Brownhill et al. ....... 370/395.7 |
| 5,898,687 A | * | 4/1999 | Harriman et al. ........... 370/390 |
| 6,128,654 A | * | 10/2000 | Runaldue et al. ........... 709/219 |
| 6,246,682 B1 | * | 6/2001 | Roy et al. ................... 370/390 |
| 6,754,211 B1 | * | 6/2004 | Brown ....................... 370/389 |
| 6,754,216 B1 | * | 6/2004 | Wong et al. ............ 370/395.42 |
| 6,789,176 B1 | * | 9/2004 | Uriu et al. ................... 711/154 |

* cited by examiner

*Primary Examiner*—Min Jung
(74) *Attorney, Agent, or Firm*—Smith-Hill and Bedell, P.C.

(57) ABSTRACT

An input port for a network switch includes a cell buffer for receiving incoming unicast and multicast cells and for writing each cell into an internal cell memory. The cell buffer thereafter forwards each unicast cell from the cell memory to one network switch output port and forwards a separate copy of each multicast cell to each of several network switch output ports. When the cell buffer writes a unicast cell to the cell memory, it sends a pointer to the storage location of the unicast cell to a queue manager. When the cell buffer writes a multicast cell to the cell memory, it sends several pointers to the queue manager, one for each output port that is to receive a copy of the multicast cell, with each pointer pointing not to the multicast cell's storage location but to an empty storage location in the cell memory. The cell buffer also maintains a database relating each pointer it sent to the queue manager to an actual storage location of a unicast or multicast cell. The queue manager queues the pointers an order in which cells are to be forwarded from the cell buffer, and thereafter returns a pointer to the cell buffer whenever the cell buffer is to forward a unicast cell or a copy of a multicast cell from the cell memory. The cell buffer applies each returned pointer to the database to determine the actual location of the unicast or multicast cell to be forwarded.

23 Claims, 5 Drawing Sheets

MULTICAST CELL BUFFER FOR NETWORK SWITCH

BACKGROUND OF THE INVENTION

1. Field of the Invention

Figure 1:
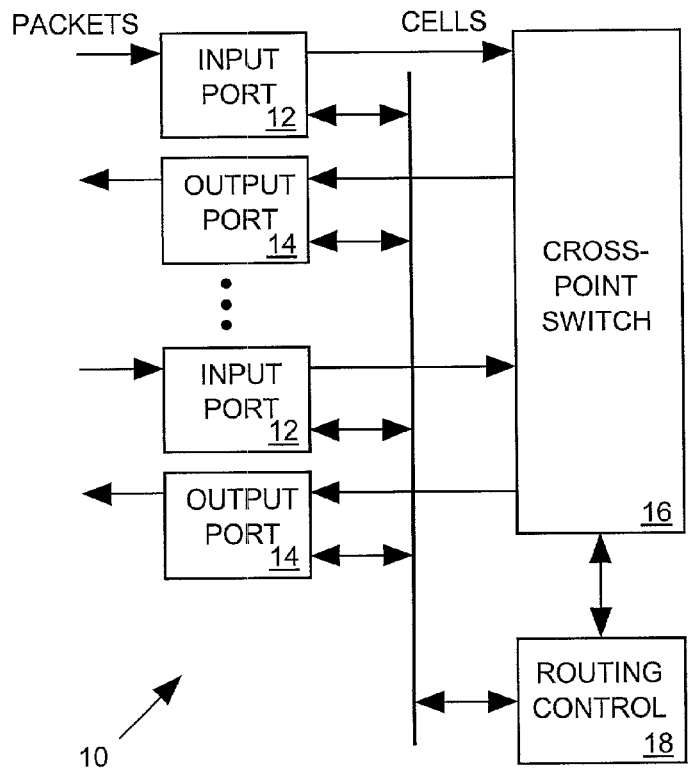

The present invention relates in general to a network switch for routing cells derived from network data transmissions, and in particular to a buffer for a network switch input port that can store an incoming multicast cell and then forward copies of the cell to many output ports.

2. Description of Related Art

A network switch routes data transmissions such as for example IP, MPLS, ATM or ethernet packets, between network buses. A network switch typically includes a set of input ports for receiving packets arriving on the buses, a set of output ports for forwarding packets outward on the buses, and a switch fabric such as a crosspoint switch for routing packets from each input switch port to the output switch ports that are to forward them. In systems where packets are of variable size, an input port may convert each packet arriving on a network bus to a sequence of cells of uniform size which can be efficiently stored in uniformly-sized buffer memory storage locations until the input port can forward them in proper sequential order through the switch fabric to one of the switch's output ports. Each output switch port stores each cell sequence arriving from an input port in its own buffer memory. The output port later reassembles them into the packet from which they were derived, then forwards the packet outward on an another network bus.

Such a network switch input or output port includes a "cell buffer" for read and write accessing the cell memory. When the cell buffer stores a cell in a free storage location of the cell memory, it passes a pointer to that storage location, along with other information about the packet, to the port's "queue manager". The queue manager keeps track of where cells assigned to each packet are stored in the cell memory and determines when each cell is to be forwarded from the cell memory. When a cell is to be forwarded from the cell memory, the queue manager sends a pointer to the cell's storage location to the cell buffer and the cell buffer then reads the cell out of the cell memory. In an input port the cell is sent to a switch interface circuit which then forwards the cell through the switch fabric to an output port that is to receive the cell. In an output port, the cell is sent to a "protocol processor" which resembles all cells of the same sequence into the packet from which the sequence was derived, and forwards the packet outward from the switch on a network bus.

In some networks a packet may be either a "unicast" packet destined for a single network station or a "multicast" packet destined for several network stations. Since a unicast packet is destined for only a single network station, a network switch need only forward a unicast packet outward toward a network destination station on only a single bus or bus channel. Thus when a cell buffer in an input or output port reads a cell derived from a unicast packet out of a cell memory and forwards it to a switch interface or a protocol processor, it can immediately free the space in the cell memory that held the cells.

On the other hand, since a multicast packet is destined for several network stations, a network switch may have to forward a multicast packet outward one several different buses or bus channels. Prior art network switches employ one of two strategies for handling a cell derived from a multicast transmission for which N copies or "instances" of the cell are to be forwarded. In a first strategy a multicast cell is stored at a single location in the cell memory and is forwarded N times from that location. The cell memory storage location is freed only after the Nth instance of the cell has been forwarded. The queue manager will therefore have tell the cell buffer to forward a copy of the multicast cell out of the cell memory to the switch interface N times and will have to signal the cell buffer when it can finally free the cell's storage location. One difficulty with such a system is that the logic for keeping track of the number of copies of each multicast cell have been forwarded from the cell buffer complicates the queue manager. The queue manager has to treat unicast and multicast cells differently.

Using the second strategy for handling multicast cells, a cell buffer determines how many instances of a multicast cells are to be forwarded and writes a copy of an incoming multicast cell into a separate cell memory storage location for each output port. The buffer manager sends a pointer to each stored cell copy to the queue manager. The queue manager is then able to treat each instance of a multicast cell in that same way that it treats a unicast cell. This strategy simplifies the queue manager because the queue manager does not have to treat multicast transmissions defiantly. However the need to write several copies of a multicast cell to the cell memory can reduce system throughput, particularly when the time the cell buffer needs to read and write access the cell memory is the main factor limiting the rate at which a network switch port can process incoming and outgoing cells.

What is needed is a way of handling multicast cells that allows it to treat each instance of a multicast cell in the same way that it treats a unicast cell, but which does not require the cell buffer to write multiple copies of a multicast cell to the cell memory.

BRIEF SUMMARY OF THE INVENTION

A network switch forwards each incoming unicast packet outward on only a single bus or bus channel and forwards each incoming multicast packet outward via more than one bus or bus channel. The network switch includes a switch fabric interconnecting a set of input and output ports. Each input port receives incoming unicast and multicast packets, converts each packet into a sequence of cells of uniform size, and stores each sequence in an internal cell memory in accordance with the invention. The input port sequentially forwards the cell sequence from its cell memory to each of one or more output ports via the switch fabric. Each output port stores each incoming unicast or multicast cell sequence in its internal cell memory and thereafter sequentially forwards the sequence out of its cell memory, reassembles it into the packet from which it was derived, and forwards the packet outward from the network switch via one or more network buses or bus channels.

In addition to the cell memory each input or output port includes a queue manager and a cell buffer. The cell buffer writes each cell of an incoming unicast or multicast sequence to a different storage location within the cell memory. For each cell derived from a unicast packet, the cell buffer sends a pointer to the cell's storage location to the queue manager. The queue manager uses the pointers to keep track of where cells of each unicast sequence are stored in the cell memory. When it determines that any cell of a unicast sequence is to be forwarded from the cell memory, the queue manager sequentially returns the pointer to that cell's storage location to the cell buffer. The cell buffer thereafter forwards the cell out of the cell memory and immediately frees the cell memory location that held that cell.

In accordance with one aspect of the invention, when the cell buffer receives and stores an incoming multicast cell sequence of which N copies or "instances" of the cell are to be later forwarded from the cell memory, the cell buffer writes each cell of the sequence to a separate location of cell memory, just as it does for unicast cell sequences. However instead of providing the queue manger with one set of pointers to the actual "root" cell memory storage locations containing the cells forming the multicast sequence, the cell buffer also provides the queue manager with N sets of pointers to cell memory locations. None of the N sets of pointers point to the actual root storage locations of the cells forming the sequence; they all point to empty cell memory storage locations. However to the queue manager it appears that the cell buffer has received and stored N unicast transmissions in the cell memory rather than a single multicast transmission. The cell buffer thereafter refrains from making use of any one of the empty cell memory storage locations referenced by the N sets of pointers until the empty storage location is "freed" as discussed below.

In accordance with another aspect of the invention, when the cell buffer sends a pointer to the queue manager, the cell buffer creates a database entry relating the pointer it sent to the queue manager to the actual ("root") storage location of a unicast or multicast cells. When the queue manager thereafter returns a pointer to a storage location containing a unicast cell or to one of N empty cell memory storage locations associated with a multicast cell, the cell buffer consults the database to determine the actual root location of the unicast or multicast cell in the cell memory. It then forwards the cell stored at that root storage location and "frees" the cell memory storage location referenced by the returned pointer, thereby making it available for storing a cell of another incoming sequence. The cell buffer keeps track of the number of times each multicast cell stored at a root location has been forwarded from the cell memory, and when all N instances of the cell have been forwarded, the cell buffer frees the root storage location.

Thus the present invention allows the queue manager to treat all incoming unicast and multicast sequences the same way without requiring the cell buffer to write more than one copy of a multicast cell sequence to the cell memory.

The claims portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS(S)

Figure 2:
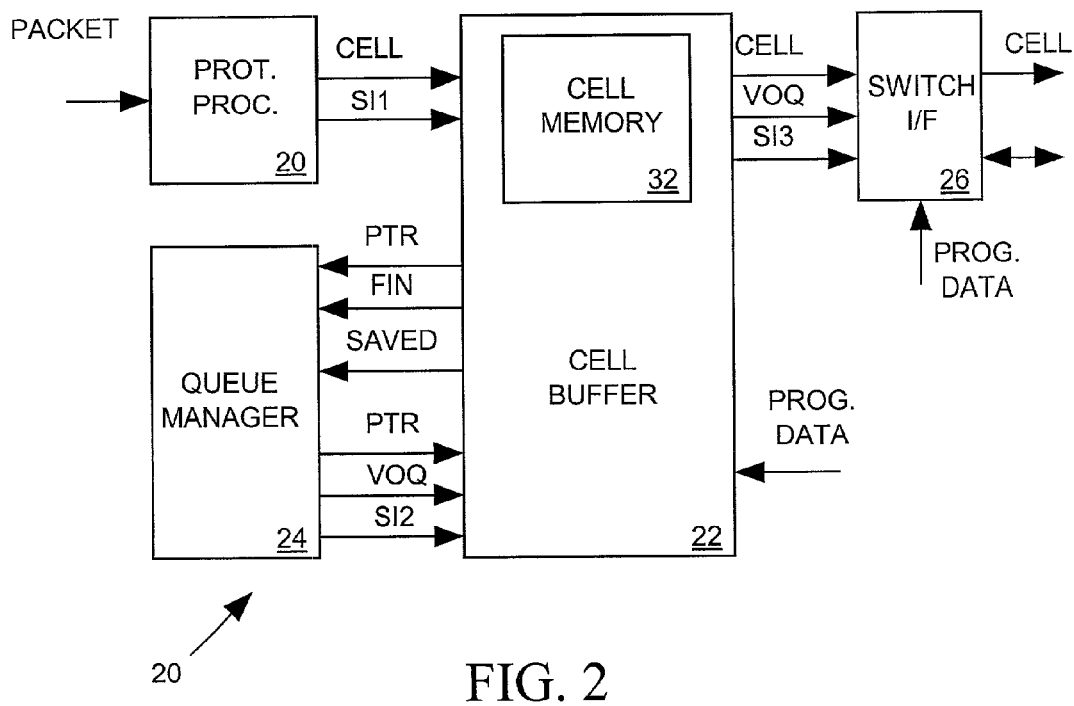
Figure 3:
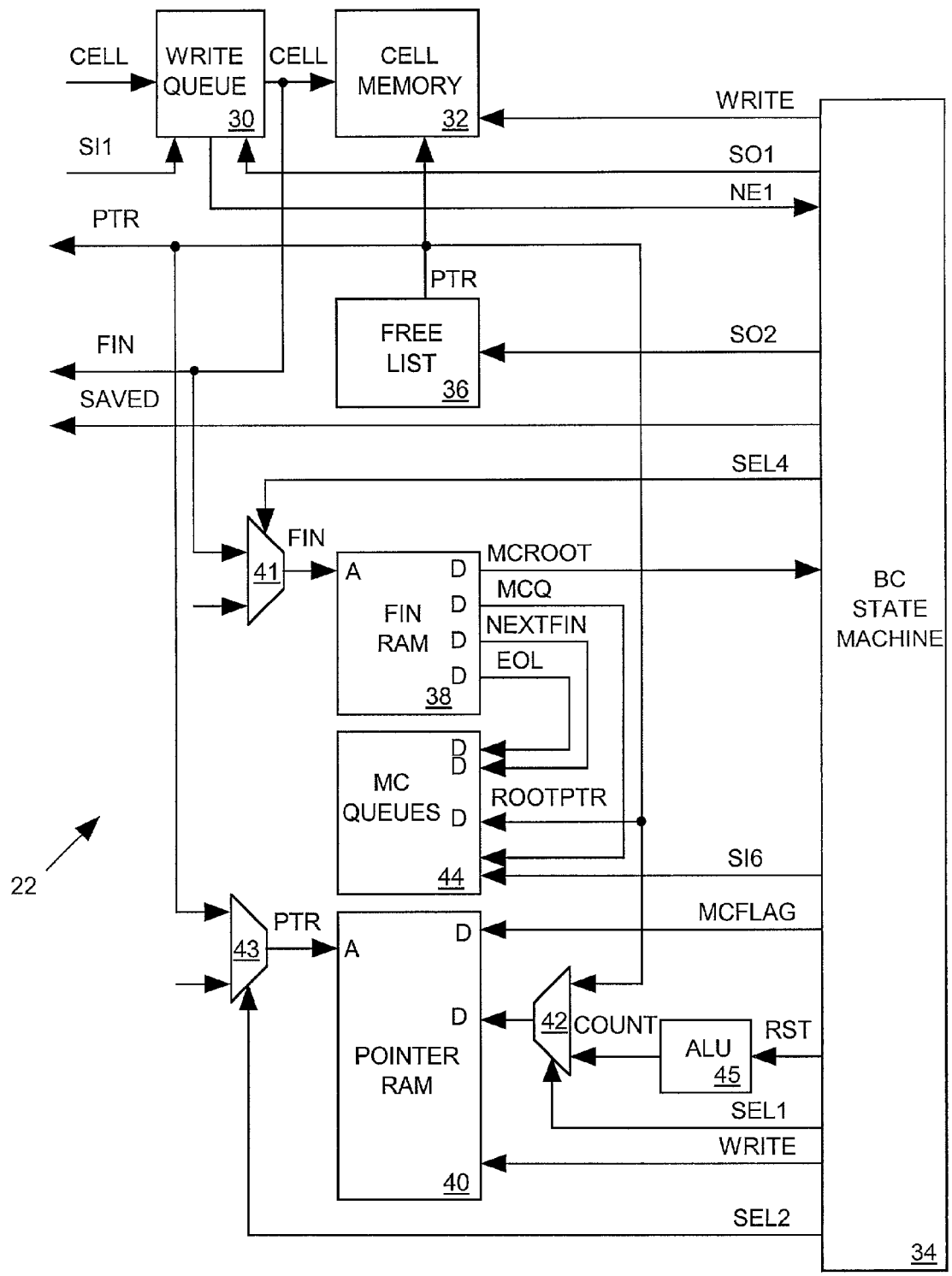
Figure 4:
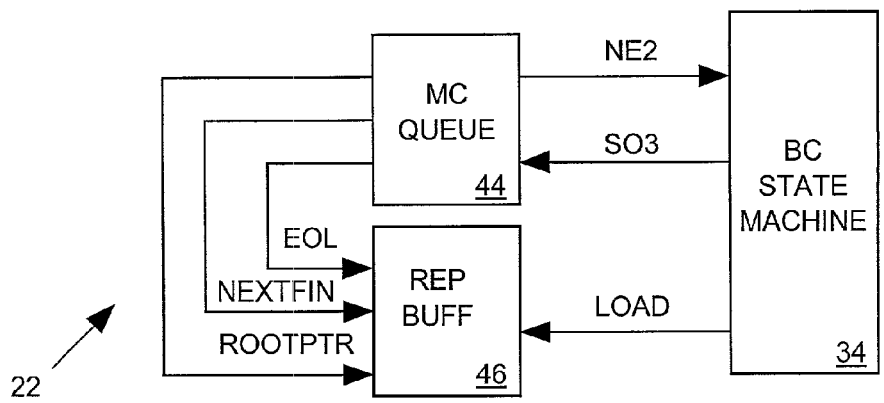
Figure 5:
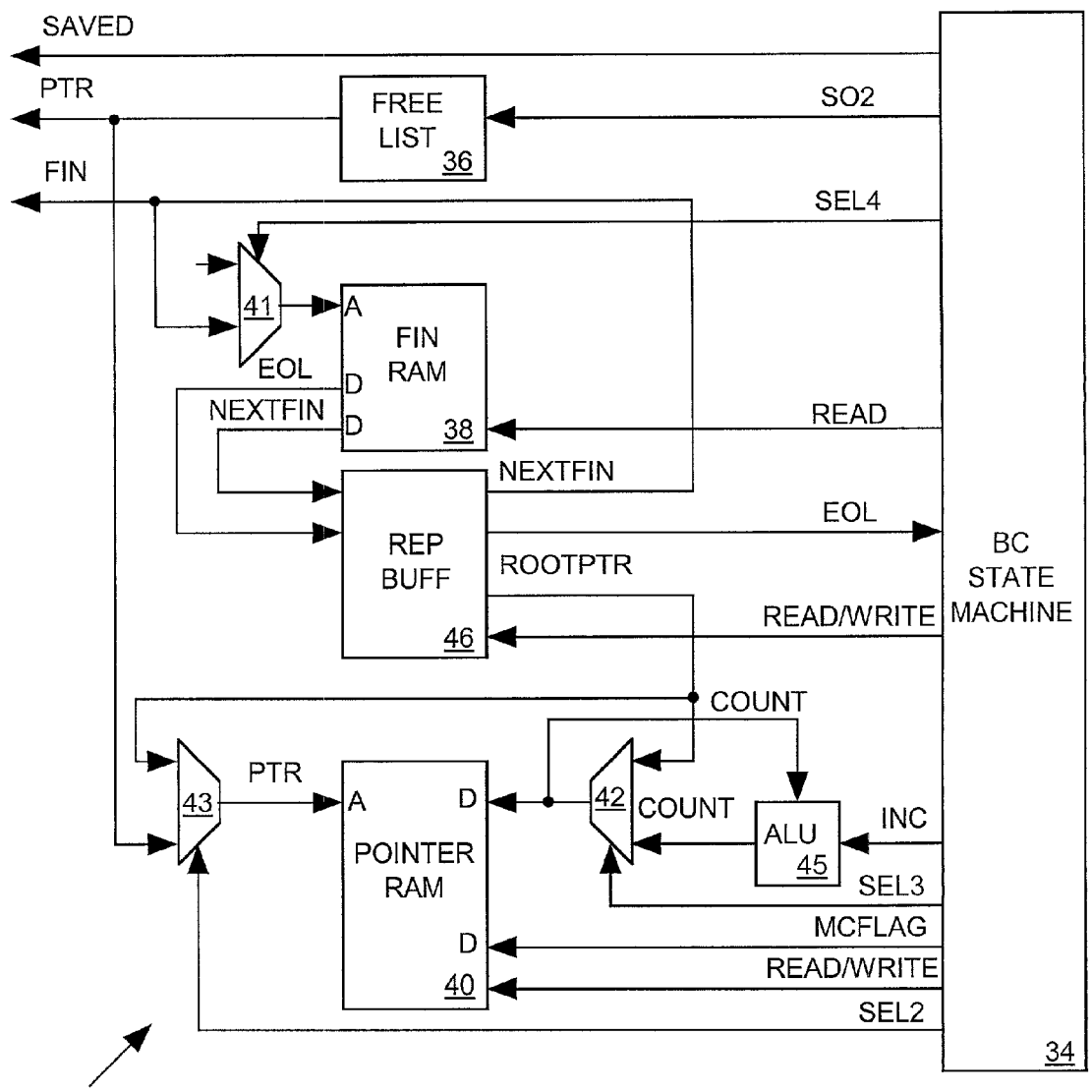
Figure 6:
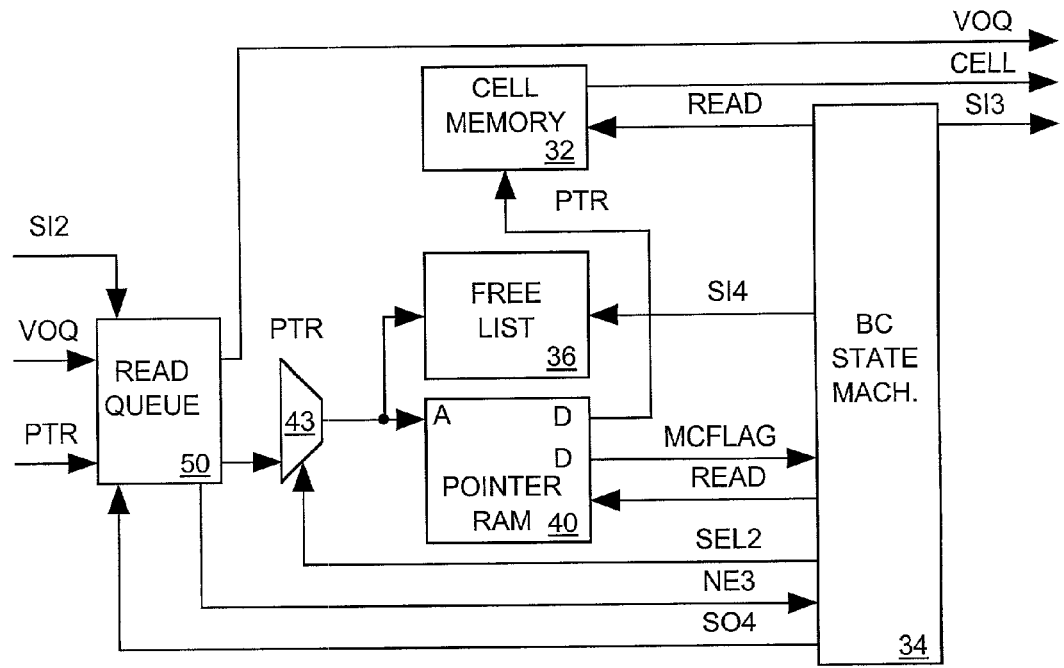
Figure 7:
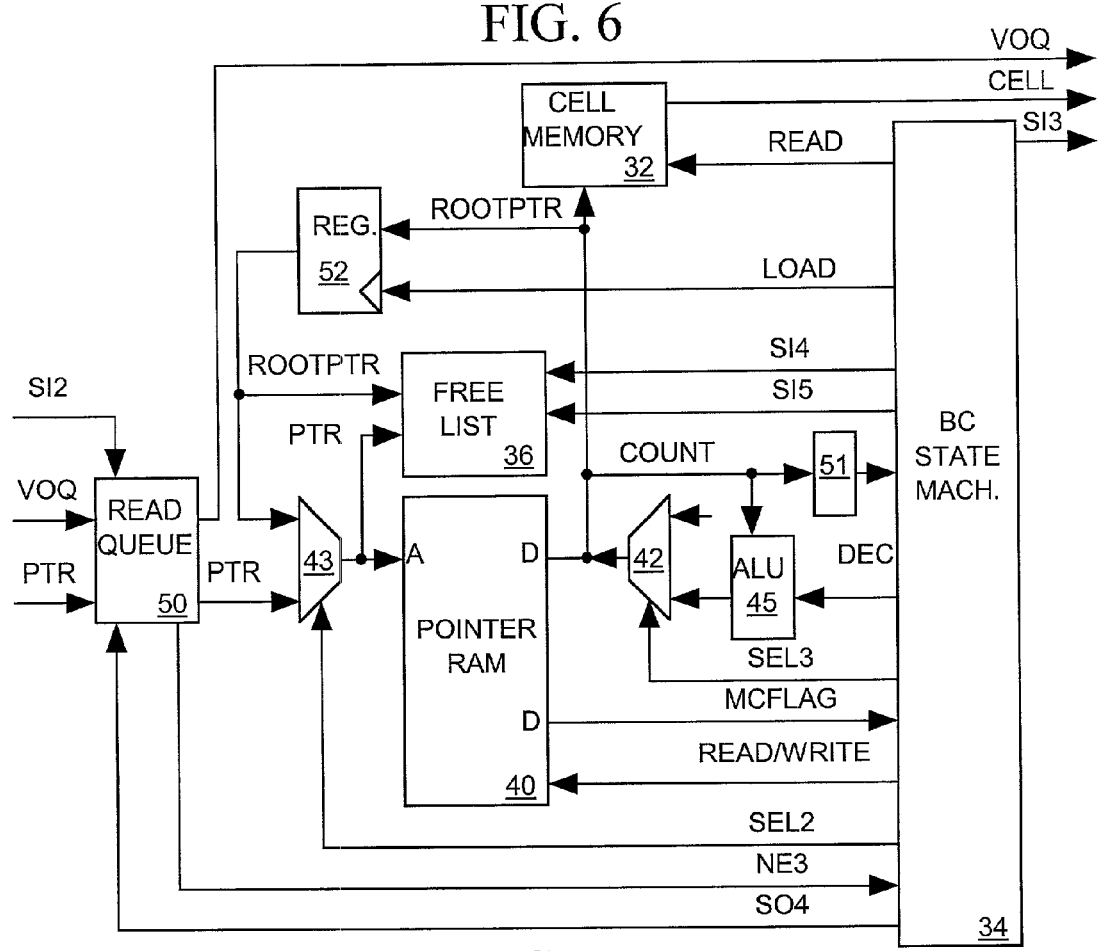
Figure 8:
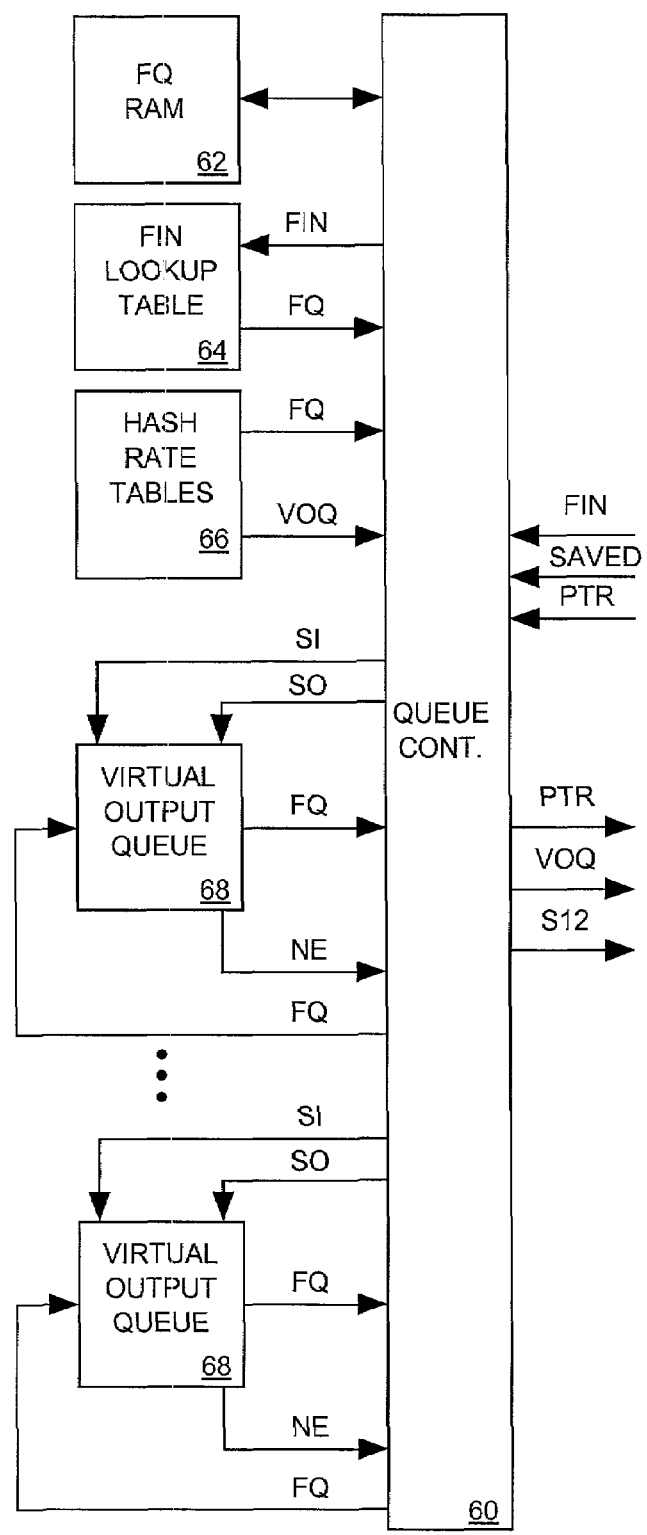

FIG. 1 illustrates a network switch in accordance with the invention in block diagram form, FIG. 2 illustrates one of the input ports of FIG. 1 in more detailed block diagram form, FIG. 3 illustrates in more detailed block diagram form portions of the cell buffer of FIG. 2 that store incoming cells, FIGS. 4 and 5 illustrate in more detailed block diagram form portions of the cell buffer of FIG. 2 that carry out a pointer replication process, FIG. 6 illustrates in block diagram form portions of the cell buffer of FIG. 2 that read out unicast cells, FIG. 7 illustrates in block diagram form portions of the cell buffer of FIG. 2 that read out multicast cells, and FIG. 8 depicts the queue manager of FIG. 2 in more detailed block diagram form.

DETAILED DESCRIPTION OF THE INVENTION

Network Switch

The invention relates to a cell buffer for a network switch which routes network data transmissions such as for example IT, MPLS, ATM or ethernet packets between network buses. The switch receives a packet arriving on a network bus, converts it into a sequence of uniform-sized cells, and then stores cells in a cell buffer. The network switch later reassembles the sequence into the packet and forwards the packet outward on one or more network bus. The network switch forwards each "unicast" packet outward on only a single bus or bus channel while it forwards each "multicast" packet outward on more than one bus or bus channel. The invention relates in particular to the manner in which the cell buffer handles cell sequences derived from multicast packets. The specification herein below describes an example of a network switch that can make use of the cell buffer and describes in detail an exemplary embodiment of a cell buffer considered to be the best mode of practicing the invention.

FIG. 1 illustrates the network switch 10 in block diagram form. Network switch 10 includes a set of input ports 12 and output ports 14 selectively linked through a switch fabric such as for example a multiplexer array or a crosspoint switch 16. Each input port 12 receives an incoming network data transmission arriving on a network bus, converts the packet into a sequence of cells of uniform size, and then stores the cells in an internal cell buffer. Thereafter when the input port 12 is ready to forward a stored cell sequence to one of output ports 14, it requests a routing control circuit 18 to provide a routing path through crosspoint switch 16 to that output port. When routing control circuit 18 establishes the path, the input port 12 forwards the cell sequence to that output port 14. The output port 14 stores the incoming cell sequence in its internal cell buffer and then later recreates the packet from the cell sequence and forwards it outward toward the packet's destination station through a network bus.

Input Port

FIG. 2 illustrates one of input ports 12 of FIG. 1 in more detailed block diagram form. Input port 12 includes a protocol processor 20 for receiving the incoming packet, and for converting it into a cell sequence. Protocol call processor 20 assigns a flow identification number (FIN) to the sequence based on information contained in the packet's header and includes the FIN number in each cell. Thereafter, as described below, the input and output ports use the FIN as a key into lookup tables containing information indicating how the ports are to treat cells assigned to each FIN. For example a FIN table may indicate which output port is to receive cell assigned to each FIN, may indicate which network bus or bus channel is to convey the packet away from switch 10, or may provide information relative to the packet's forwarding priority. Protocol processor 20 also includes a start of packet bit (SOP) and an end of packet bit (EOP) in each cell indicating whether it is the first or last packet of the sequence. As it generates each cell, protocol processor 20 delivers the cell to a cell buffer 22 and pulses a shift in signal (SI1) to tell the cell buffer to acquire the cell and to store it in an internal random access cell memory 32.

When it stores a unicast cell, cell buffer 22 sends the cell's FIN and the pointer (PTR) to the storage address of the cell to a queue manager 24 and pulses a SAVED signal to tell the queue manager to acquire the pointer and the FIN number. In addition to referencing a cell's output port destination, the cell's FIN also references the cell's forwarding priority and other factors which influence the order and timing with which the cell is to be forwarded from the cell buffer. Queue manager 24 keeps track of all the cells stored in cell buffer 22, determines which output port 14 is to receive each cell, and determines when the cell buffer is to read each cell out of cell memory 32 and forward it to a switch interface circuit 26. Switch interface circuit 26 stores cells it receives from cell buffer 22 in internal queues, requests routing control circuit 18 to establish a signal path to the output port that is to receive each cell, and then forwards the cell to that output port when the path is available.

When queue manager 24 decides it is time for cell buffer 22 to forward a particular unicast cell to switch interface 26, it supplies the cell buffer with the pointer (PTR) to the cell's storage address and a "virtual output queue" (VOQ) number referencing the output port 14 that is to receive the cell. It then pulses a shift in signal (SI2) to tell cell buffer 22 to acquire the pointer and VOQ number. Thereafter cell buffer 22 reads the cell out of its internal cell memory, and forwards the cell, along with the VOQ number queue manager 24 supplied to switch interface 26. Cell buffer 22 pulses another shift in signal SI3 to tell switch interface 26 to acquire the cell and its accompanying VOQ number. Cell buffer 22 then frees the cell memory space containing the unicast cell so that it may receive another incoming cell.

Cell buffer 22 handles cells derived from a multicast packet differently from cells derived from a unicast packet. While it stores an incoming multicast cell at one address of its internal cell memory 32, cell buffer 22 does not send the pointer to that address to queue manager 24. Cell buffer 22 includes an internal database programmed by input programming data which associates a set of "child" FINs with each multicast FIN. Each child FIN of the set references a separate one of output ports 14 to receive the multicast cell. After receiving and storing a multicast cell at some "root" cell memory location, cell buffer 22 sends a sequence of pointers PTR to spare locations of cell memory 32 to queue manager 24, one for each instance of the multicast cell to be forwarded to a separate output port. Cell buffer 22 provides a separate one of the child FINs and pulses the SAVED signal with each pointer PTR it sends to queue manager 24. This makes queue manager 24 think that cell buffer 22 has received and separately stored several instances of the multicast cell at separate locations in the cell memory and that each cell has a separate FIN, when in fact cell buffer 2 has stored only the single multicast cell at one root storage location. Thus after cell buffer 2 has received and stored a multicast cell sequence, it appears to queue manager 24 that cell buffer 22 has received and stored several unicast sequences, each associated with a separate FIN, rather than a single multicast transmission.

Thereafter queue manager 24 schedules each instance of a multicast cell to be forwarded from the cell buffer 22 to separate output ports 14 via switch interface 26 in the same way it schedules a unicast cell for departure by returning to cell buffer 22 a pointer PTR to the storage location it believes to be holding the instance and along with the VOQ number associated with the child FIN.

As described below, cell buffer 22 maintains another internal database that relates each empty cell memory storage locations which the queue manager 24 believes contain an instance of a multicast cell to the actual storage location of the multicast cell. When it receives a PTR/VOQ pair from queue manager 24, cell buffer 22 checks that data to determine whether pointer PTR points to a storage location containing a unicast cell or to an empty storage location that is associated with an instance of a multicast cell. If the pointer points to a unicast cell, cell buffer 22 forwards the unicast cell to switch interface 26 and frees its cell memory space for storing another cell. When the pointer from queue manager 24 points to an empty storage location associated with an instance of a multicast cell, cell buffer forwards the multicast cell from its actual cell memory storage location to switch interface 26. While it frees the empty storage location that was associated with the instance of the multicast cell upon forwarding the instance, cell buffer 22 only frees the root cell memory storage location containing the multicast cell when it has forwarded every instance of it.

While cell buffer 22 could actually write an instance of a multicast cell to each cell memory storage location associated with it when the cell buffer receives the multicast cell, the multiple cell memory read and write operations needed to do so would tie up the cell memory 32, thereby preventing cell buffer 22 from processing more incoming cells until it has finished replicating all instances of the multicast cell. Since it takes a relatively long time to read and write access cell memory 32, such a multicast cell replication process would reduce the switch port's throughput. Instead, cell buffer 22 writes the multicast cell only to one root location in cell memory 32 and simply sends queue manager 24 pointers to cell memory storage locations at which it could have, but didn't, write the various cell instances. Since the pointer replication process does not involve write accessing cell memory 32, cell buffer 22 can carry out the pointer replication process as a background process that does not interfere with its ability to write or read other cells into or out of cell memory 32.

Cell Buffer—Arrival Protocol

FIG. 3 illustrates portions of cell buffer 22 of FIG. 2 that process and store each incoming cell from protocol processor 20 in cell memory 32. Referring to FIGS. 2 and 3, each pulse of the SI1 signal shifts an incoming cell from protocol processor 20 into a write queue 30, a first-in, first-out (FIFO) buffer capable of holding several cells. The longest stored cell appears as the write queue's output. Write queue 30 sends a "not empty" signal (NE1) to a buffer control (BC) state machine 34 when at least one cell resides in the write queue. When it is ready to write the cell-to-cell memory 32, BC state machine 34 responds to the NE1 signal by pulsing a WRITE signal to tell cell memory 32 to store the cell at an address referenced by a PTR output of a "free list" memory 36. Free list memory 36 maintains a list of all of the storage locations in cell memory 32 that are currently available for receiving a cell and provides a pointer to one such free storage location as its output.

Each cell includes either a unicast FIN or a multicast FIN, and the FIN of the current cell output of write queue 30 addresses a FIN RAM 38 via a multiplexer 41 controlled by a select signal SE4 from BC state machine 34. Fin RAM 38 has a separate entry for each possible FIN value. Each entry in the FIN RAM 38 with programming data provided by an external host computer (not shown) and includes a bit (MCROOT) indicating whether the FIN that addresses that entry is a multicast FIN. The MCROOT bit tells BC state machine 34 how to process the cell. When the MCROOT bit is false, indicating that the cell at the output of write queue 30 is a unicast cell rather than a multicast cell, BC state machine 34 pulses the SAVED signal to tell queue manager 24 that it has saved the cell at the cell memory location indicated by the current PTR of free list 36. BC state machine 34 uses an SEL2 signal to set a multiplexer 43 to pass the same pointer PTR that addresses cell memory 32 as an address input to a pointer RAM 40 having the same number of storage locations as cell memory 32. BC state machine 34 then pulses a WRITE signal input to pointer RAM 40 telling it to store an MCFLAG bit output of BC state machine 34 and the current pointer PTR output of free list 36 supplied via a multiplexer 42 controlled by a SEL1 signal from BC state machine 34. BC state machine 34 sets the MCFLAG bit false to indicate that the cell is a unicast cell. Thereafter, BC state machine 34 signals write queue 30 via a shift out signal SO1 to shift out a next cell to be stored in cell memory 32 and signals free list memory 36 via a shift out signal SO2 to provide a new pointer PTR to a spare cell memory location for receiving the next cell.

Thus when BC state machine 34 stores a unicast cell at an address of cell memory 32 referenced by the PTR output of free list memory 36, it also stores the pointer at the same address of pointer RAM 40, along with an MCFLAG bit set to indicate that the cell stored at that address of cell memory 32 is a unicast cell rather than a multicast cell. As discussed in more detail below, whenever queue manager 24 sends buffer manager 22 a pointer to a cell to be read out of cell memory 32, pointer RAM 40 acts as a look up table or a database to convert the pointer supplied by queue manager 24 to a pointer to the actual cell memory storage location of the cell to be read out.

When the MCROOT bit FIN RAM 38 supplies to BC state machine 34 indicates that the output cell of write queue 30 is a multicast cell conveying a multicast FIN, BC state machine 34 writes the cell to the cell memory 32 address referenced by the pointer output PTR of free list 36 but does not pulse the SAVED signal to forward the pointer and the multicast cell's FIN to queue manager 24. For multicast cells, BC state machine 34 creates an entry in one of a set of multicast (MC) queues 44. As mentioned above, cell buffer 32 provides queue manager 24 with a separate pointer PTR and FIN for each instance of a multicast cell that is to be forwarded from the cell buffer. Each entry in one of MC queues 44 relates to a multicast cell currently stored in cell memory 32 for which cell buffer 32 has not yet sent the instance pointers and FINs to queue manager 24. There is one set of MC queues 44 for each separate class of service. Cell buffer 22 processes each entry in each MC queue 44 in the order the entries were added to that queue and at a rate determined by the queue's class of service.

The data stored in FIN RAM 38 implements a separate linked list for each multicast FIN, each referencing a set of "child FINs". Each child FIN corresponds to an instance of the multicast cell to be forwarded and is the FIN that buffer manager 22 sends to queue manager 24 with the pointer PTR associated with that instance. The FIN RAM 38 entry for each multicast FIN forms the root of the linked list for that multicast FIN, and the root entry contains a field (NEXTFIN) indicating the first child FIN of the linked list.

Each subsequent entry of the list other than a last entry of the list also contains a NEXTFIN field referencing the next child FIN of the linked list. All of the entries on the linked list include an end of list bit (EOL), and the EOL bit is set true only in the next to last entry of the list to indicate that the next entry is the last entry of the list. The root entry of the list also contains an MCQ field indicating which one of MC queues 44 is to receive a new entry with a multicast cell is written into cell memory 32. The FIN RAM 38 acts as a database relating each multicast FIN to a set of child FINs.

When BC state machine 34 writes a multicast cell to cell memory 32 and FIN PAM 38 reads out the data fields addressed by the cell's multicast FIN, the MCROOT bit tells BC state machine 34 not only to create an entry in pointer RAM 40, it also tells the BC state machine to shift a new entry into the MC queue 44 selected by the MCQ output of FIN RAM 38. The new MC queue 44 entry contains information that cell buffer 22 will need later when generating and supplying a pointer and a FIN number to queue manager 24 for each instance of the multicast cell to be forwarded. The data included in the new MC queue 44 entry includes the pointer (ROOTPTR) to the actual storage location of the multicast cell in cell memory 32 and the NEXTFIN, and EOL output fields of FIN RAM 38. As discussed below, when it later processes that MC queue entry to supply the instance pointers and FINs to queue manager 34, BC state machine 34 creates a separate entry in pointer RAM 40 for each instance of the multicast cell to be forwarded, and later uses that entry to translate from the instance pointer supplied by queue manager 24 to the pointer to the actual cell memory storage location (ROOTPTR) of the multicast cell.

Cell Buffer—Pointer Replication Protocol

When any of the four MC queues 44 is not empty, BC state machine 34 carries out a "pointer replication" process for the longest stored entry in that queue whereby it supplies a separate pointer and FIN to queue manager 34 for each instance of a multicast cell referenced by the MC queue entry.

FIGS. 4 and 5 illustrate portions of cell buffer 22 of FIG. 2 that carry out the pointer replication process. As illustrated in FIG. 4, when one of MC queues 44 contains at least one entry, it sends a not empty signal NE2 to BC state machine 34. When it is ready to process an MC queue entry in one of the four MC queues 44, BC state machine 34 signals that replication buffer 46 to load data fields included in the longest-stored entry of that MC queue 44. BC state machine 34 then signals that MC queue 44 via a shift out signal SO3 to discard the entry.

The data fields loaded into the replication buffer 46 include a NEXTFIN field referencing the first of the linked list of child FINs associated with a multicast FIN, an EOL bit indicating whether the referenced child FIN is the next-to-last FIN of the linked list, and the pointer (ROOTPTR) to the actual storage location in the cell memory of the multicast cell. As illustrated in FIG. 5, BC state machine 34 creates a set of entries in pointer RAM 40, one for each instance of the multicast cell to be forwarded.

To create the first entry in pointer RAM 40, BC state machine 34 signals an arithmetic logic unit (ALU) 45 to set its output field to 1 and sets multiplexer 41 so that the current NEXTFIN output of replication buffer 46 read addresses FIN RAM 38. When FIN RAM 38 then reads out the EOL and NEXTFIN fields associated with the next entry to replication buffer 46, BC state machine 34 signals replication buffer 46 to store those fields. BC state machine 34 sets multiplexer 42 to apply the current pointer output of free list 36 as address input to pointer RAM 40, sets multiplexer 42 to supply the pointer (ROOTPTR) current stored in buffer 46 as a data input to pointer RAM 40, and sets the MCFLAG data input to pointer RAM 40 true to indicate that the entry relates to an instance of a multicast cell to be forwarded. BE state machine then signals replication buffer 48 to read out is ROOTPTR, EOL an NEXTFIN fields, and signals pointer RAM 40 to write its input dat to the address location indicate by the pointer output of multiplexer 43.

BC state machine 34 continues to traverse the linked list in FIN RAM 38 in a similar manner creating a new pointer RAM 40 entry, incrementing the COUNT output of ALU 45, and sending each FIN value and a new pointer for each element on the linked list until the EOL bit output of replication buffer 46 indicates the next entry is the end of the linked list. Upon creating the pointer RAM entry for the last entry on the linked lists, BC state machine 34 will have created one new entry in pointer RAM 40 for each instance of the multicast FIN to be forwarded. Queue manager 24 will have received a PTR and child FIN value for each instance, and the COUNT field output of ALU 45 will indicate the total number of multicast cell instances to be forwarded. At that point BC state machine 34 sets multiplexer 42 to pass the COUNT filed output of ALU 45 as a data input to pointer RAM 40 and sets multiplexer 43 to pass the ROOTPTR output of replication buffer as the address input to pointer RAM 40 and then signals pointer RAM 40 to save the COUNT data at that address. The pointer replication process for the multicast cell now being complete, BC state machine 34 is then ready to carry out a similar pointer replication process for a next entry of the same or another MC queue 44.

Cell Buffer—Departure Protocol

FIG. 6 illustrates the portions of cell buffer 22 of FIG. 2 that read a unicast cell out of cell memory 32 when queue manager 24 sends a pointer to the unicast cell to the cell buffer. Referring to FIGS. 2 and 6, the SI2 signal from queue manager 24 (FIG. 2) sequentially shifts PTR/VOQ pairs for cells to be read out of cell memory 32 into a read queue 50, and the read queue sends a NE3 signal pulse to BC state machine 34 when it is not empty. The longest stored PTR/VOQ pair appears at the output of read queue 50. When BC state machine 34 is ready to read a cell out of cell memory 32, it sets multiplexer 43 to pass the pointer PTR output of read queue 50 to the addressing input of pointer RAM 40 and signals the MC RAM to read out the pointer PTR and MCFLAG bit stored at the addressed location. The PTR output of pointer RAM 40 addresses cell memory 32. When a unicast cell is stored at that cell memory address, the pointer output of pointer RAM 40 will match its input pointer from multiplexer 43. The MCFLAG bit tells BC state machine 34 to signal cell memory 32 to read out that unicast cell. When it does so, BC state machine 34 pulses the SI3 input to switch interface 26 (FIG. 2) to tell it to acquire the cell and to acquire the VOQ data currently appearing at the output of read queue 50. Thereafter BC state machine 34 signals free list memory 36 to add the pointer output of multiplexer 43 to the list of free storage locations to free the space holding the read out unicast cell. BC state machine 34 also signals read queue 50 via a shift out signal SO4 to shift its next longest stored PTR/VOQ pair, if any, to its output.

FIG. 7 illustrates portions of cell buffer 22 of FIG. 2 that forward instances of a multicast cell. When the PTR output of the read queue 50 references a storage location in pointer RAM 40 associated with an instance of a multicast cell stored in cell memory 32, RAM 40 reads out a pointer (ROOTPTR) to the actual cell memory storage location of the multicast cell, and that ROOTPTR output will differ from the PTR output of multiplexer 43. The MCFLAG bit output of pointer RAM 40 tells BC state machine 34 that an instance of a multicast cell is to be forwarded. With the ROOTPTR field addressing the multicast cell, BC state machine 34 signals cell memory 32 to read out the multicast cell and then pulses the SI3 input to switch interface 26 (FIG. 2) to tell it to acquire the cell along with the VOQ data currently appearing at the output of read queue 50. BC state machine 34 also signals a register 52 via a LOAD signal to save the ROOTPTR field. Thereafter BC state machine 34 pulses an SI4 signal to tell free list memory 36 to free the storage location referenced by the PTR output of multiplexer 43, and then signals read queue 50 via a shift out signal SO4 to shift out the PTR/VOQ.

BC state machine 34 then switches multiplexer 43 to apply the ROOTPTR stored in register 52 as the address input to pointer RAM 40 which then reads out the COUNT data field of the root entry for the multicast cell. A decoder 51 tells BC state machine 34 if the COUNT field has value 1. If the COUNT field has a value greater than 1, BC state machine 34 decrements the COUNT field and writes it back into the root entry via multiplexer 42. However if the COUNT field read out of pointer RAM 40 has value 1, then BC state machine 34 knows that all of the instances of the multicast cell that are to be forwarded have been forwarded. In that case, BC state machine 34 pulses an SI5 input to free list memory 36 telling it to free the cell memory 32 storing location containing the multicast cell identified by the ROOTPTR output of register 52.

Queue Manager

FIG. 8 depicts queue manager 24 of FIG. 2 in more detailed block diagram form. A queue controller 60 responds to the SAVED signal input from cell buffer 22 of FIG. 2 by applying the accompanying FIN to a lookup table 64 which returns a "flow queue" (FQ) number associated with that FIN. More than one FIN may be associated with the same FQ number. Queue controller 60 then appends an entry containing the incoming pointer (PTR) to a linked list associated with that FQ number that queue controller 60 maintains in a flow queue RAM 62. Queue controller 60 maintains a separate linked list of pointers in RAM 62 for each flow queue. Table 64 assigns all cells having the same FIN number to the same flow queue, and all cells assigned to the same flow queue are forwarded to the same output port 14 (FIG. 1). Several different flow queues may be directed to the same output port, but the flow queues may have differing forwarding priorities and assigned forwarding rates. Each output port 14 of FIG. 1 is associated with a separate VOQ number. A set of hash rate tables 66 periodically generate FQ and VOQ numbers. The rate at which hash rate tables 66 generate each VOQ number controls the rate at which the input port may forward cells to the output port 14 associated with that VOQ, and the rate at which hash rate tables 66 generate each FQ number controls the rate at which cells assigned to that FQ are forwarded. Queue controller 60 shifts each FQ generated by hash tables 66 into an appropriate one of a set of virtual output queues 68 (suitably FIFO buffers) and then shifts FQs out of virtual output queues at the rate hash tables 66 generate associated VOQ number. When one of virtual output queues 68 shifts out an FQ number, queue controller 60 reads the pointer (PTR) out of the oldest linked list entry in FQ RAM 62 for the flow queue associated with that FQ number and sends it to cell buffer 22 along with the VOQ number to which the FQ was assigned, and then pulses the SI2 signal to load the PTR/VOQ pair into the cell buffer.

Thus has been shown and described an input port 12 for a network switch 10 including a cell buffer 22 for receiving incoming unicast and multicast cells and for writing each cell into its internal cell memory 32. As described above, when cell buffer 22 writes a multicast cell to cell memory 32, it consults the database maintained in FIN RAM 38 to determine the set of child FINs associated with the multicast FIN and sends a separate pointer with each child FIN to queue manager 24, one for each output port 14 that is to receive a copy of the multicast cell. Pointer points not to the multicast cell's storage location but to an empty storage location within cell memory 32. Cell buffer 22 maintains another database (pointer RAM 40) relating each pointer it sent to queue manager 24 to an actual storage location of the multicast cell that is to be read out when the queue manager returns the pointer. Queue manager 24 returns the pointers to cell buffer 24 in an order in which cells are to be forwarded and cell buffer 22 applies each returned pointer to pointer RAM 40 to determine the actual location of the multicast cell to be forwarded. By using pointer RAM 40 as a database relating pointers returned by queue manager 24 to the actual storage location of a multicast cell, cell buffer 22 avoids having to store multiple copies of the multicast cell in cell memory 32. Thus having written an incoming multicast cell into cell memory 32 once, cell buffer 22 is free to write or read access the cell memory again for another incoming or outgoing cell. While it takes time for cell buffer 22 to create several entries in pointer RAM 40 after writing a multicast cell into cell memory 32, the process of creating entries in pointer RAM 40 is carried out as a background process while the cell buffer read and write accesses other cells in the cell memory.

The forgoing specification and the drawings depict what the applicants consider to be the best mode of practicing the invention, and elements or steps of the depicted best mode are examples of the elements or steps recited in the appended claims. However the appended claims are intended to apply to any mode of practicing the invention comprising the combination of elements or steps as recited in any one of the claims, including elements or steps that are functional equivalents of the example elements or steps depicted in the specification and drawings. Should any appended claim describe an element by providing a description of its particular function including no express structural limitations, then that description of the element is intended to read on anything capable of carrying out that particular function, regardless of its structure and regardless of the structure of any example element depicted in this specification or in the drawings.

What is claimed is:

1. An apparatus for receiving, storing and forwarding multicast cells and unicast cells, the apparatus comprising:
   a cell buffer, including a plurality of storage locations and a first database, for receiving and writing a multicast cell into a first one of its plurality of storage locations, for thereafter generating a plurality of first pointers, each referencing a separate one of said plurality of storage locations other than the first storage location to which the multicast cell was written, and for creating a separate entry in its first database for each generated first pointer, the entry relating the first pointer to the first storage location to which the multicast cell was written; and
   a queue manager for receiving the first pointers generated by the cell buffer and for thereafter returning the first pointers to the cell buffer,
   wherein upon receiving each first pointer returned by the queue manager, the cell buffer consults the first pointer's entry in the first database to determine the first storage location the entry relates to the first pointer, and then reads an instance of the multicast cell out of that first storage location.

2. The apparatus in accordance with claim 1
   wherein the cell buffer also receives and writes a unicast cell into a second one of the storage locations, forwards a single second pointer to the queue manager referencing the second storage location, and thereafter creates another entry in the first database for the second pointer relating the second pointer to the second storage location,
   wherein the queue manager also receives and stores the second pointer generated by the cell buffer and thereafter returns the second pointer to the cell buffer, and
   wherein upon receiving the second pointer returned by the queue manager, the cell buffer consults the second pointer's entry in the first database to determine the second storage location the entry relates to the second pointer, and then reads the unicast cell out of the second storage location.

3. The apparatus in accordance with claim 1
   wherein the multicast cell includes a multicast flow identification number (FIN) having a value identifying the multicast cell as forming a part of an incoming sequence of cells,
   wherein the cell buffer further includes a second database relating the multicast FIN's value to a plurality of child FINs having values differing from the multicast FIN value,
   wherein each child FIN identifies a corresponding instance of the multicast cell to be read out of the first storage location as forming a part of a separate outgoing sequence of cells,
   wherein the cell buffer reads the multicast FIN included in the multicast cell when it stores the multicast cell in the first storage location and thereafter consults the second database to determine the plurality of child FINs related to the multicast FIN, generates a separate one of the first pointers corresponding to each of the child FINs, arid forwards each first pointer with its corresponding child FIN to the queue manager, and
   wherein the queue manager makes a determination as to when to return each first pointer to the cell buffer stored as the value of its corresponding child FIN.

4. The apparatus in accordance with claim 3
   wherein the cell buffer maintains a tree list of pointers, each referencing a separate one of the plurality of storage locations that is available for storing a cell,
   wherein the cell buffer obtains a pointer to the first storage location from the free list when it writes the multicast cell to the first storage location, and then removes that pointer from The free list.

5. The apparatus in accordance with claim 4 wherein the cell buffer generates each of the first pointers by obtaining it from the free list and thereafter removes each of the first pointers from the free list.

6. The apparatus in accordance with claim 5 wherein whenever the queue manager returns any one of the first pointers to the cell buffer, the cell buffer returns that first pointer to the free list.

7. The apparatus in accordance with claim 6 wherein the cell buffer maintains a first pointer count, wherein the cell buffer increments the first pointer count whenever it sends one of the first pointers to the queue manger, and decrements the first pointer count whenever the queue manager returns one of the first pointers.

8. The apparatus in accordance with claim 7 wherein the cell buffer returns a pointer to the first storage location to the free list when the count indicates the queue manager has returned all of the plurality of first pointers to the cell buffer.

9. The apparatus in accordance with claim 8
   wherein the cell buffer also receives a unicast cell, obtains a second pointer to a second storage location from the free list, forwards the second pointer to the queue manager, removes the second pointer from the free list, and thereafter creates another entry in the first database relating the second pointer to the second storage location,
   wherein the queue manager also receives and stores the second pointer generated by the cell buffer, and thereafter returns the second pointer to the cell buffer, and
   wherein upon receiving each second pointer from the queue manager, the cell buffer consults the second pointer's entry in the first database to determine the second storage location referenced thereby, and then reads the unicast cell out of the referenced storage location arid returns the second pointer to the free list.

10. The apparatus in accordance with claim 9 further comprising:
    a switch interface circuit for receiving each instance of the multicast cell that the cell buffer reads out of the first storage location in response to each first pointer returned by the queue manager;
    a plurality of output ports, each for receiving, storing and forwarding cells; and
    a switch fabric for providing paths for conveying cells from the switch interface circuit to each of the plurality of output ports,
    wherein the switch interface circuit forwards each instance of the multicast cell to a separate one of the output ports via the paths provided by the switch fabric.

11. The apparatus in accordance with claim 10
    wherein the queue manager includes a third database relating each child FIN to one of a plurality of virtual output queues, each virtual output queue (VOQ) corresponding to a separate one of the output ports,
    wherein when the queue manager returns any aria of the first pointers to the cell buffer, it also sends to the cell butter a VOQ number identifying the VOQ to which the third database relates the first pointer's corresponding child FIN,
    wherein when the cell buffer reads the multicast cell out of the first storage location upon receiving that first pointer, it forwards the multicast cell and the VOQ number it received from the queue manager to the switch interface circuit, and
    wherein the switch interface circuit forwards the received multicast cell to the output port associated with the VOQ identified by the VOQ number it received with the multicast cell.

12. The apparatus in accordance with claim 3 further comprising;
    a switch interface circuit for receiving each instance of the multicast cell that the cell buffer reads out of the first storage location in response to each first pointer returned by the queue manager;
    a plurality of output ports, each for receiving, storing and forwarding cells; and
    a switch fabric for providing paths for conveying cells from the switch interface circuit to each of the plurality of output ports,
    wherein The switch interface circuit forwards each instance of the multicast cell to a separate one of the output ports via the paths provided by the switch fabric.

13. The apparatus in accordance with claim 12
    wherein the queue manager includes a third database relating each child FIN to one of a plurality of virtual output queues, each virtual output queue (VOQ) corresponding to a separate one of the output ports,
    wherein when the queue manager returns any one of the first pointers to the cell buffer, it also sends to the cell buffer a VOQ number identifying the VOQ to which the third database relates the first pointer's corresponding child FIN,
    wherein when the cell buffer reads the multicast cell out of the first storage location upon receiving that first pointer, it forwards the multicast cell and the VOQ number it received from the queue manager to the switch interface circuit, and
    wherein the switch interface circuit forwards the received multicast cell to the output port associated with the VOQ identified by the VOQ number it received with the multicast cell.

14. The apparatus in accordance with claim 1 further comprising:
    a switch interface circuit for receiving each instance of the multicast cell that the cell buffer reads out of the first storage location in response to each first pointer returned by the queue manager;
    a plurality of output ports, each for receiving, storing and forwarding cells; and
    a switch fabric for providing paths for conveying cells from the switch interface circuit to each of the plurality of output ports,
    wherein the switch interface circuit forwards each instance of the multicast cell to a separate one of the output ports via the paths provided by the switch fabric.

15. A method for receiving, storing and forwarding multicast cells and unicast cells, the method comprising the steps of:
    a. receiving and writing a multicast cell into a first one of a plurality of storage locations;
    b. generating a plurality of first pointers, each referencing a separate one of said plurality of storage locations other than the first storage location to which the multicast cell was written,
    c. creating a separate entry in a first database for each generated first pointer, the entry relating the first pointer to the first storage location to which the multicast cell was written;
    d. sending the first pointers to a queue manage which stores the first pointers and controls when instances of the multicast cells are read out of the first storage location by thereafter sequentially providing the first pointers as output; and
    e. responding to each first pointer the queue manager provides as output by consulting the first pointer's entry in the first database to determine the first storage location that the entry relates to the first pointer and then reading an instance of the multicast cell out of that first storage location.

16. The method in accordance with claim 15 further comprising the steps of:
    f. receiving and writing a unicast cell into a second one of the storage locations;
    g. creating an entry in the first database for the second pointer relating the second pointer to the second storage location;

h. forwarding a single second pointer to the queue manager referencing the second storage location, wherein the queue manager also receives and stores the second pointer and thereafter provides the second pointer as output; and i. responding to the second pointer when provided as output by the queue manager by consulting the second pointer's entry in the first database to determine the second storage location the entry relates to the second pointer and then reading the unicast cell out of the second storage location.

17. The method in accordance with claim 15 wherein the multicast cell includes a multicast flow identification number (FIN) having a value identifying the multicast cell as forming a part of a sequence of multicast cells, the method further comprising the steps of:

f. reading the multicast FIN included in the multicast cell;

g. consulting a second database to determine a plurality of child FINs the second database relates to the multicast FIN, each of the first pointers generated at step b corresponding to a separate one of the child FINs, wherein each child FIN identifies a corresponding instance of the multicast cell to be read out of the first storage location as forming a part of a separate outgoing sequence of cells; and h. forwarding each child FIN to the queue manager with a corresponding one of the pointers sent at step b, wherein the queue manager determines a time at which to provide each first pointer as output based on a value of its corresponding child FIN.

18. The method in accordance with claim 17 further comprising the steps of:

i. maintaining a free list of pointers, each referencing a separate one of the plurality of storage locations that is available for storing a cell, j. obtaining a pointer to the first storage location from the free list when writing the multicast cell to the first storage location, and then k. removing that pointer from the free list.

19. The method in accordance with claim 18 wherein each of the first pointers is generated at step b by obtaining them from the free list, wherein the method further comprises the step of:

l. removing each of the first pointers from the free list after forwarding the first pointers to the queue manager.

20. The method in accordance with claim 19 further comprising the step of m. adding each of the first pointers to the free list when provided as output by the queue manger.

21. The method in accordance with claim 20 further comprising the steps of:

n. incrementing a first pointer count whenever one of the first pointers is sent to the queue manger, o. decrementing the first pointer count whenever the queue manager provides one of the first pointers as output, and p. adding a pointer to the first storage location to the free list when the count indicates the queue manager has provided each one of the plurality of first pointers as output.

22. The method in accordance with claim 21 further comprising the steps of:

q. forwarding each instance of the multicast cell read out of the first storage location in response to each first pointer provided by the queue manager as output to a separate destination.

23. The method in accordance with claim 22 wherein the queue manager includes a third database relating each child FIN to one of a plurality of virtual output queues, each virtual output queue (VOQ) corresponding to a separate multicast cell destination, wherein when the queue manager provides any one of the first pointers as output, it also provides as output a VOQ number identifying the VOQ to which the third database relates the first pointer's corresponding child FIN, and wherein each instance of the multicast cell is forwarded at step g in response to each first pointer to the destination corresponding to the VOQ identified by the VOQ number the queue manager provided as output with the first pointer.

* * * * *